Aug. 21, 1962  H. B. HEATH  3,049,834
SELF-IRRIGATING FLOWER POT
Filed Aug. 26, 1960  4 Sheets-Sheet 1

INVENTOR.
HOWARD B. HEATH
BY
McMorrow, Berman & Davidson
ATTORNEYS

Aug. 21, 1962  H. B. HEATH  3,049,834
SELF-IRRIGATING FLOWER POT
Filed Aug. 26, 1960  4 Sheets-Sheet 2

INVENTOR.
HOWARD B. HEATH
BY
McMorrow, Berman & Davidson
ATTORNEYS

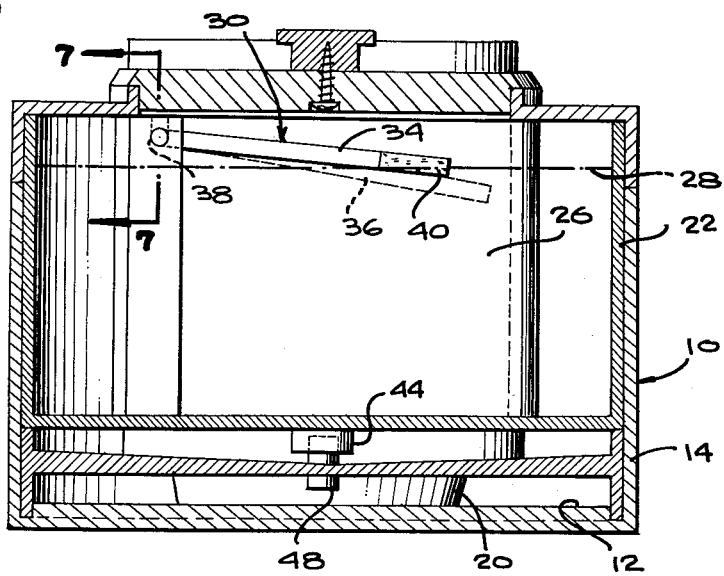
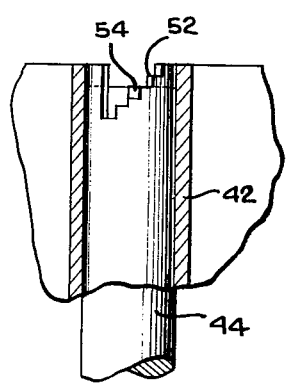
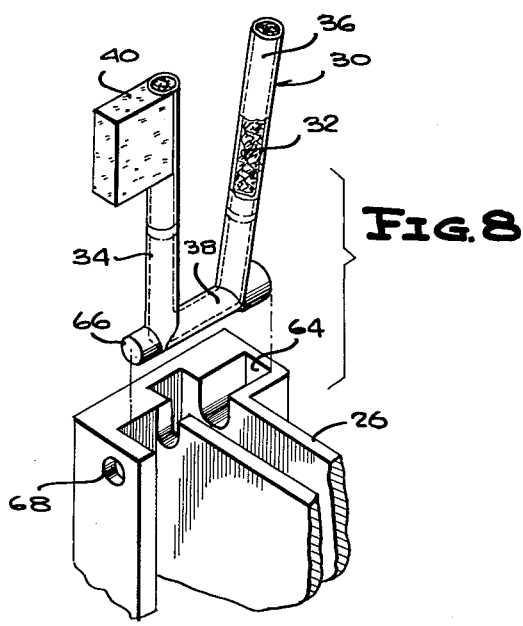
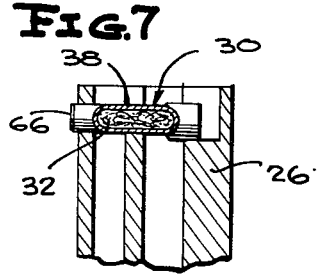

INVENTOR.
HOWARD B. HEATH
BY
McMorrow, Berman & Davidson
ATTORNEYS

United States Patent Office 3,049,834
Patented Aug. 21, 1962

3,049,834
SELF-IRRIGATING FLOWER POT
Howard B. Heath, Rte. 2, Frenchtown Road, Elkton, Md.
Filed Aug. 26, 1960, Ser. No. 52,214
5 Claims. (Cl. 47—38)

The present invention relates to flower pots generally and in particular to a self-irrigating flower pot.

Previously proposed and presently in use are flower pots having means for irrigating a plant growing therein. Generally, the irrigating means consists in a wick having one end in a reservoir of water and having the other end embedded in the soil of the flower pot. The devices in use or proposed have not been entirely satisfactory for many reasons and chiefly the devices fail to adequately provide moisture to the plant in the flower pot over a period of time without flooding the flower pot at the beginning of a period of time and later not providing sufficient moisture.

An object of the present invention is to provide a self-irrigating device for a flower pot which regulates the amount of moisture provided to the plant in the flower pot so that the plant is not flooded nor is it deprived of water at any time over a relatively long period of time.

Another object of the present invention is to provide a self-irrigating device for a flower pot which is automatic in operation, one which lends itself to adjustment with ease and facility, one which is entirely automatic in operation and requires little or no attention over a relatively long period of time, and one which is economically feasible.

These and other objects and advantages of the present invention will be fully apparent from the following description when taken in conjunction with the annexed drawings, in which:

FIGURE 5 is a view taken on the line 5—5 of FIGURE 2;

FIGURE 6 is a view on an enlarged scale, taken on the line 6—6 of FIGURE 4;

FIGURE 7 is a view taken on the line 7—7 of FIGURE 5;

FIGURE 8 is an isometric exploded view showing the wick of the present invention.

Figure 1:
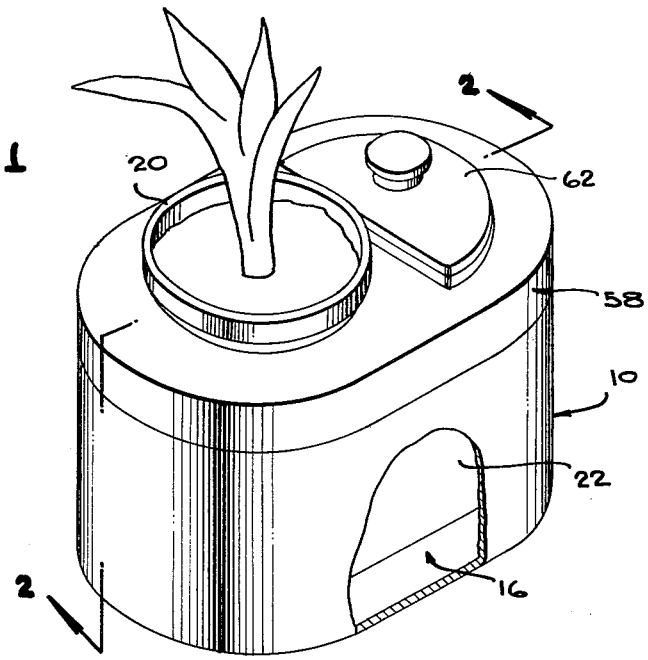
FIGURE 1 is an isometric view of the irrigating device of the present invention, shown with a flower pot installed therein.

Referring in greater detail to the drawings in which like numerals indicate like parts throughout the several views, the reference numeral 10 designates an outer receptacle having a bottom 12 and an upstanding wall 14 rising from the perimeter of the bottom 12.

Within the receptacle 10 is a horizontally disposed tray 16, the upper face of which serves as an accumulator. An open-ended sleeve 18 rising from the tray 16 serves as a first part of a well into which a flower pot 20 may be inserted, as shown most clearly in FIGURE 2.

Figure 2:
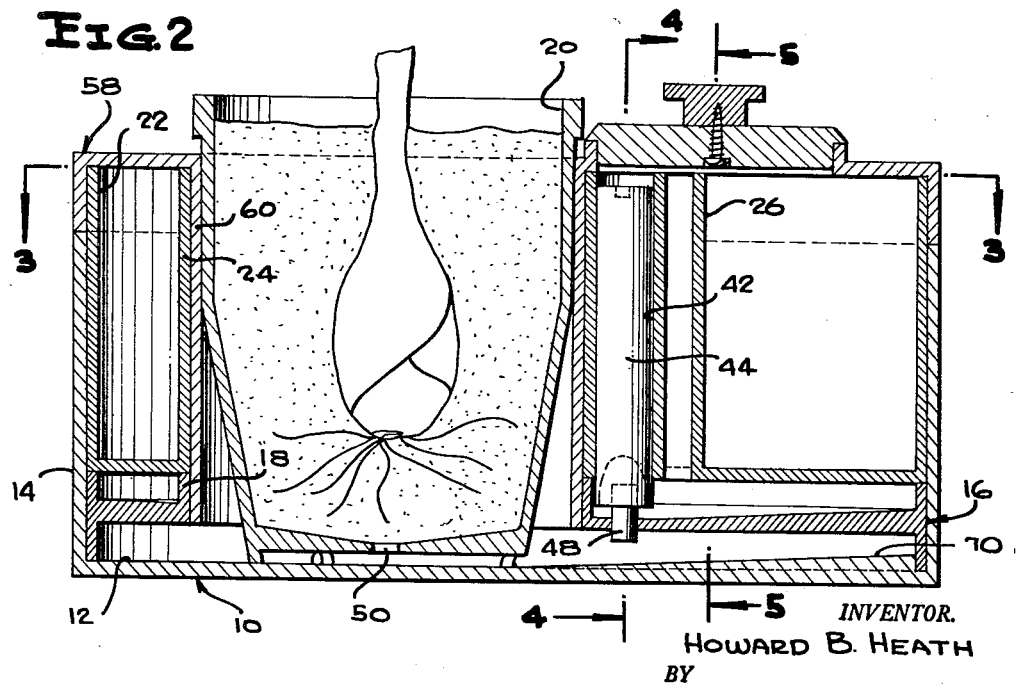
FIGURE 2 is a view on an enlarged scale, taken on the line 2—2 of FIGURE 1.
Figure 3:
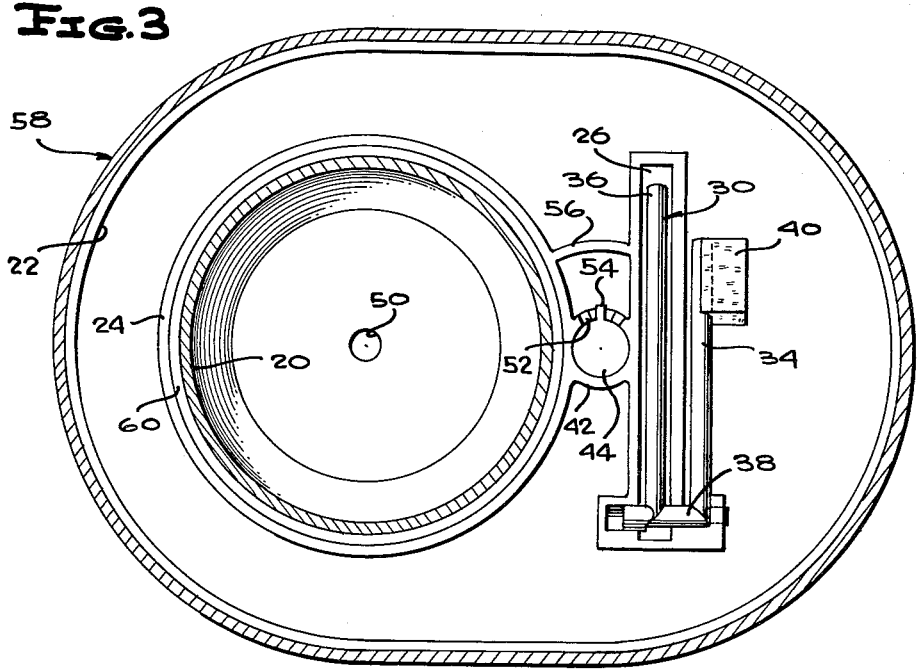
FIGURE 3 is a view taken on the line 3—3 of FIGURE 2.

An open top inner receptacle constituting a reservoir 22 is insertable into the upper end of the receptacle 10 and when within the receptacle 10 is seated upon the tray 16, as shown most clearly in FIGURE 2. The reservoir 22 has an upstanding enclosure 24 in registry with the sleeve 18 and continuing the sleeve 18 to form a well for the flower pot 20.

The reservoir 22 has formed within it an upstanding tunnel member 26 having both of its ends open with the lower end in communication with the accumulator formed by the portion of the tray 16 exteriorly of the sleeve 18.

The upper end of the tunnel member 26 is disposed so as to be above the level of a body of water contained in the reservoir 22, as indicated by a dotted line in FIGURE 5 and designated by the numeral 28.

A first siphoning means is operatively connected to the reservoir 22 and the accumulator formed by the tray 16 for feeding water contained in the reservoir 22 into the tray 16. This siphoning means consists in a U-shaped conduit 30 having a wick 32 therein, as shown in FIGURE 8. The conduit 30 has its legs 34 and 36 disposed in offset relation so that when the bight 38 of the conduit 30 is supported upon one end of the tunnel member 26, the leg 34 is within the reservoir 22 and the leg 36 is within the tunnel member 26, as shown in dotted lines in FIGURE 5.

A float 40 is carried on the free end of the leg 34 of the conduit 30 and maintains the open end of the leg 34 on the top of the body of water contained within the reservoir 22, as shown in FIGURE 5.

Figure 4:
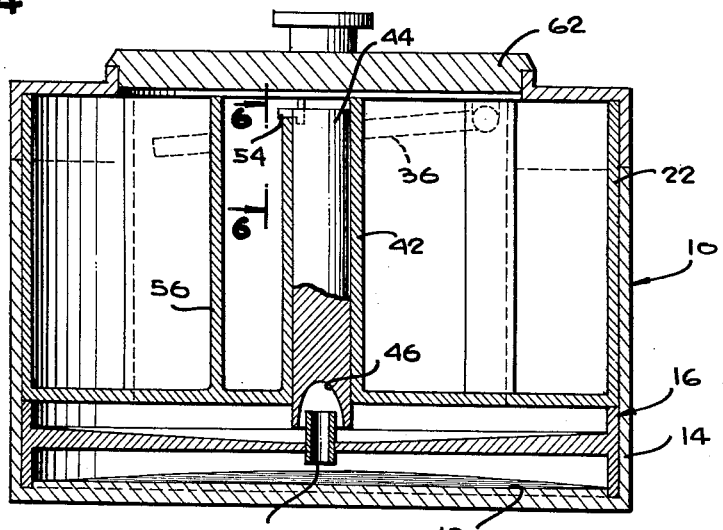
FIGURE 4 is a view taken on the line 4—4 of FIGURE 2.
Figure 9:
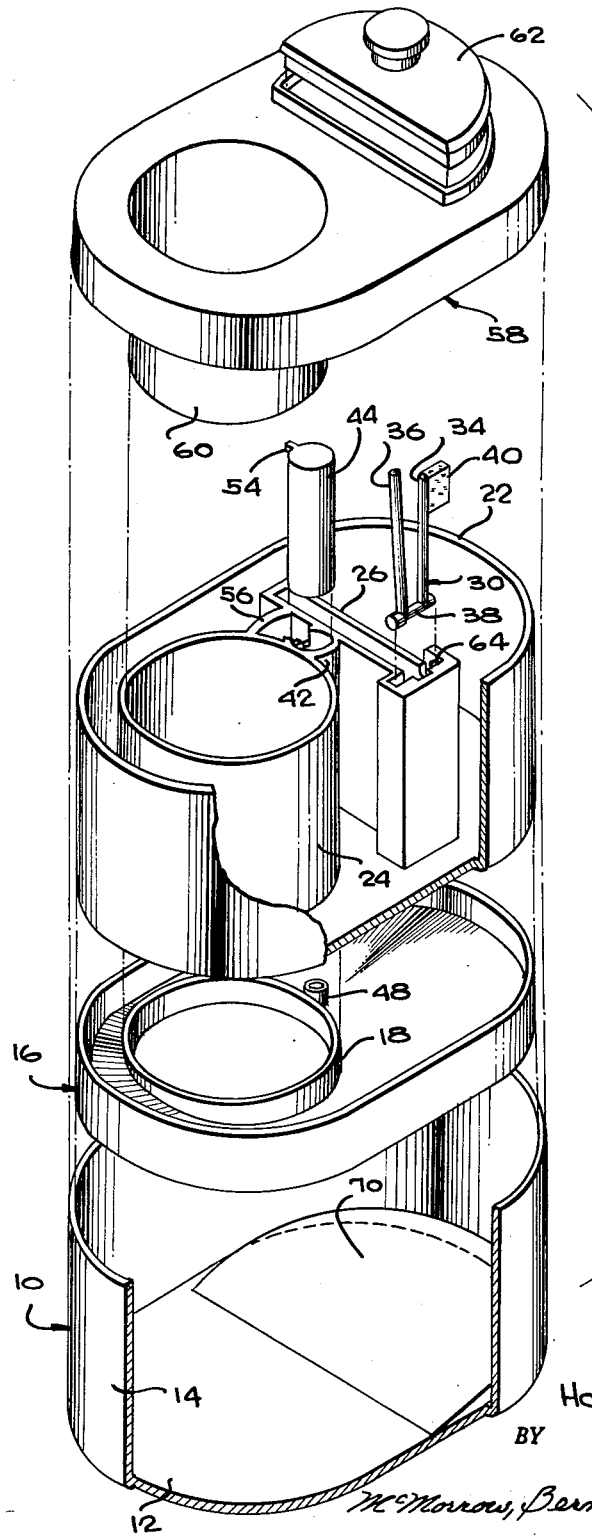
FIGURE 9 is an isometric exploded view of the assembly shown in FIGURE 1 with the flower pot removed.

Formed integrally with the wall 24 and the tunnel member 26 is an upstanding cylindrical chamber 42 having its upper end above the level of the body of water in the reservoir 22 and having its lower end opening into the top of the tray 16, as shown most clearly in FIGURE 4. Slidable within the chamber 42 is a cylindrical element 44 having an arcuately curved recess 46 in the lower end thereof. The element 44 is disposed in axial aligned relation with respect to a nipple 48 supported in the floor of the tray 16 and forms a second siphon means for emptying the tray 16 of accumulative water discharged thereinto from the reservoir 22, as will be hereinafter explained in detail.

The upper end of the nipple 48 is within the recess 46 and the lower end is opened in communication with the bottom of the receptacle 10 which constitutes a well for containing a body of water around the lower end of the flower pot 20 for supplying water to the flower pot 20 through a hole 50 provided in the bottom of the latter.

With reference to FIGURE 6, the wall of the chamber 42 is provided with a series of notches 52 and the element 44 is provided with a lug 54 received on any one of the notches 52 for adjusting the element 44 upwardly or downwardly within the chamber 42.

A vertically disposed partition 56 extends between the wall 24 and the tunnel member 26 on the side of the chamber 42 having the notches 52 for the purpose of extruding water from the chamber 42 through the area of the notches 52.

The partition 56 reinforces the structure of the wall 24 and the tunnel member 26.

A cover is provided for the receptacle 10 and is designated generally by the reference numeral 58. The cover 58 includes a well member 60 slidably received within the wall 24, as shown most clearly in FIGURE 2. The cover 58 has a removable lid 62 of semicircular shape, disposed so as to provide an access opening to the tunnel member 26 and the wick 32.

The upper end of the tunnel member 26 is provided with a recess 64 conformably shaped to the bight 38 and adjacent portions of the legs 34 and 36 of the conduit 30 for supporting the conduit 30 for limited rotational movement about the recess in the upper end of the tunnel member 26 as a horizontal axis.

One end of the bight 38 is provided with a protuberance 66 received in a hole 68 provided in the tunnel member 26 for positioning the bight 38 so that the float 40 is within the reservoir 22 and the leg 36 is within the tunnel member 26.

In use, a supply of water is kept within the reservoir 22 and the water is absorbed by the wick 32 in the conduit 30 and transferred a drop at a time from the reservoir 22 to the tunnel member 26 in which it flows downwardly into the accumulator formed by the tray 16. When the level of the water within the tray 16 reaches the upper end of the nipple 48 within the recess 46, a siphoning action takes place and the water in the tray 16 is transferred into the bottom of the receptacle 10 where it is available for the roots of the plant contained within the pot 20.

The receptacle bottom 12 is provided with a sloping portion 70 having its perimeter spaced inwardly from the wall 14 and serving only to direct a flow of water within the receptacle 10 toward the bottom of the flower pot 20 whenever water is admitted into the receptacle 10 through the nipple 48. The sloping portion 70 accounts for any sloping position of the receptacle 10, and assures that any water deposited in the bottom of the receptacle 10 will reach the plant roots.

The diameter of the conduit 30 and the density of the wick 32 may be varied in order to vary the amount of water siphoned from the reservoir during any given interval of time, and the element 44 may be shifted upwardly or downwardly on the notches 52 to vary the amount of water discharged periodically to the flower pot. The element 44 constitutes a metering means for controlling the quantity of water discharged to the flower pot at any one time.

What is claimed is:

1. In a self-irrigating device for flower pots, an outer receptacle having a bottom and an upstanding wall rising from the perimeter of said bottom, a tray positioned within said receptacle and spaced above and adjacent said receptacle bottom, an open-ended sleeve rising from said tray, an inner receptacle including an upstanding enclosure disposed within said receptacle and bridging and supported upon said tray and constituting a reservoir, said upstanding enclosure seating upon said sleeve and forming with said sleeve a well for receiving a flower pot to be irrigated, a first siphoning means operatively connected to said reservoir and said tray for feeding water contained in said reservoir into said tray, and a second periodically-operating siphoning means operatively connecting said tray and said well for feeding water contained in said tray into said well.

2. The self-irrigating device according to claim 1 wherein said first siphoning means includes a float operatively connected to said reservoir and said tray.

3. The self-irrigating device according to claim 1 wherein said first siphoning means includes a float-actuable wick operatively connected to said reservoir and said tray.

4. The self-irrigating device according to claim 1 which includes in addition an upstanding open-ended tunnel member disposed in said reservoir so that the upper end is above the level of a body of water when contained therein and having the lower end in communication with said tray, and said first siphoning means comprising a siphon having one end within said tunnel member and having the other end within said reservoir, and a float on said other end of said siphon, said siphon having a portion intermediate the ends supported on said tunnel member upper end for limited swinging movement of said siphon about a horizontal axis.

5. The self-irrigating device according to claim 4 in which said first siphoning means embodies a U-shaped wick having one leg within said tunnel member and having the other leg within said reservoir, a float on said other leg of said wick, said wick having the bight thereof supported on said tunnel member upper end for limited swinging movement of said wick about a horizontal axis.

References Cited in the file of this patent

UNITED STATES PATENTS

| 2,837,867 | Courtenay | June 10, 1958 |
| 2,885,825 | Longacre | May 12, 1959 |

FOREIGN PATENTS

| 83,441 | Sweden | May 21, 1935 |